(12) United States Patent
Machida et al.

(10) Patent No.: US 10,092,136 B2
(45) Date of Patent: Oct. 9, 2018

(54) METHOD FOR PRODUCING INSTANT FRIED NOODLES AND FRYING TREATMENT DEVICE

(71) Applicant: NISSIN FOODS HOLDINGS CO., LTD., Osaka-shi, Osaka (JP)

(72) Inventors: Noriyuki Machida, Osaka (JP); Yasuhiro Higashida, Osaka (JP); Shigeru Yasuda, Osaka (JP); Mitsuru Tanaka, Osaka (JP)

(73) Assignee: NISSIN FOODS HOLDINGS CO., LTD., Osaka (JP)

( * ) Notice: Subject to any disclaimer, the term of this patent is extended or adjusted under 35 U.S.C. 154(b) by 95 days.

(21) Appl. No.: 14/391,537

(22) PCT Filed: Mar. 28, 2013

(86) PCT No.: PCT/JP2013/059217
§ 371 (c)(1),
(2) Date: Oct. 9, 2014

(87) PCT Pub. No.: WO2013/153956
PCT Pub. Date: Oct. 17, 2013

(65) Prior Publication Data
US 2015/0086689 A1    Mar. 26, 2015

(30) Foreign Application Priority Data
Apr. 10, 2012 (JP) .................................. 2012-089249

(51) Int. Cl.
*A47J 37/12* (2006.01)
*A23L 7/109* (2016.01)
*A23L 7/113* (2016.01)

(52) U.S. Cl.
CPC ........... *A47J 37/1276* (2013.01); *A23L 7/109* (2016.08); *A23L 7/113* (2016.08); *A47J 37/128* (2013.01); *A47J 37/1214* (2013.01); *A47J 37/12* (2013.01)

(58) Field of Classification Search
CPC ... A23L 1/16; A23L 1/162; A47J 37/12; A47J 37/1214; A47J 37/1276; A47J 37/128
See application file for complete search history.

(56) References Cited

U.S. PATENT DOCUMENTS

| 3,892,874 A | 7/1975 | Ando | |
| 4,269,113 A * | 5/1981 | Ishida | A21B 5/08 99/404 |

(Continued)

FOREIGN PATENT DOCUMENTS

| CN | 103771 | 9/1988 |
| JP | 52-154542 A | 12/1977 |

(Continued)

OTHER PUBLICATIONS

Sakurazawa, JP 06285336.*

(Continued)

*Primary Examiner* — Michele L Jacobson
*Assistant Examiner* — Preston Smith
(74) *Attorney, Agent, or Firm* — Global IP Counselors, LLP

(57) ABSTRACT

A method for producing instant fried noodles which includes the steps of: reversing a noodle lump upside down within 15 seconds after detaching the noodle lump from oil in a fry tank in a frying treatment of the instant fried noodles; putting gelatinized noodle strings in a plurality of retainers pivotally supported by two endless parallel chains; immersing the plurality of retainers, in which the noodle strings have been put by movements of the two chains, in a fry tank to fry the (Continued)

noodle strings; detaching the retainers from oil in the fry tank by movements of the two chains; reversing the retainers upside down by rotating the pivotally supported retainers within 15 seconds after the detachment; conveying the retainers in a state in which the retainers are reversed upside down by movements of the chains; and separating a plurality of fried noodle lumps from the retainers.

14 Claims, 13 Drawing Sheets

(56) References Cited

U.S. PATENT DOCUMENTS

| | | | |
|---|---|---|---|
| 5,419,240 A * | 5/1995 | Morishita | A47J 37/1214 426/439 |
| 2002/0160093 A1 | 10/2002 | Sakai et al. | |
| 2003/0134020 A1* | 7/2003 | Sakurazawa | A23L 1/0121 426/523 |
| 2010/0323070 A1 | 12/2010 | Seto et al. | |
| 2013/0122173 A1 | 5/2013 | Nagayama | |
| 2013/0287921 A1 | 10/2013 | Nagayama | |

FOREIGN PATENT DOCUMENTS

| | | |
|---|---|---|
| JP | 60-196160 A | 10/1985 |
| JP | 62-22536 A | 1/1987 |
| JP | H06-075477 B2 | 9/1994 |
| JP | 06-311934 A | 11/1994 |
| JP | 2004-187781 A | 7/2004 |
| JP | 2008-278788 A | 11/2008 |
| JP | 2008-284106 A | 11/2008 |
| JP | 2009-249111 A | 10/2009 |
| TW | I241891 B | 10/2005 |
| TW | 201210514 A1 | 3/2012 |
| WO | 2008-081931 A1 | 7/2008 |

OTHER PUBLICATIONS

Translation JP08140865.*
International Search Report of the corresponding International Application No. PCT/JP2013/059217, dated May 14, 2013.
Written Opinion of the corresponding International Application No. PCT/JP2013/059217, dated May 14, 2013.
Office Action in the corresponding Taiwanese Patent Application No. 10520591390 dated May 13, 2016.
Office Action in the corresponding European Patent Application No. 13775146.7 dated Mar. 9, 2016.
Supplementary Search Report in the corresponding European Patent Application No. 13775146.7 dated Feb. 29, 2016.

* cited by examiner

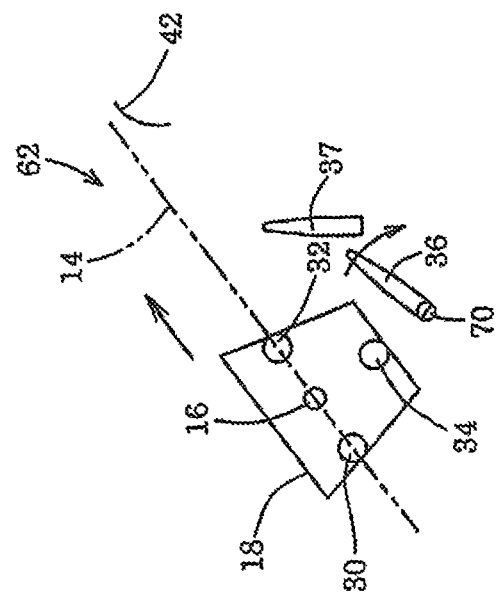
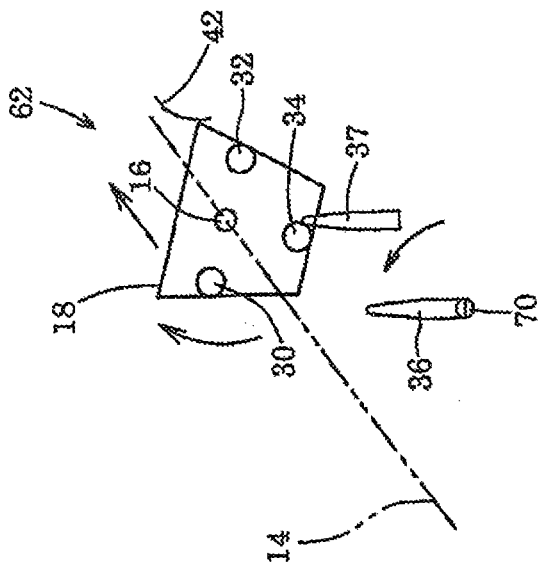
FIG. 9 (b)
FIG. 9 (a)

METHOD FOR PRODUCING INSTANT FRIED NOODLES AND FRYING TREATMENT DEVICE

CROSS-REFERENCE TO RELATED APPLICATIONS

This application is a U.S. National stage application of International Application No. PCT/JP2013/059217, filed Mar. 28, 2013, which claims priority under to Japanese Patent Application No. 2012-089249 filed in Japan on Apr. 10, 2012. The entire contents of Japanese Patent Application No. 2012-089249 are incorporated by reference herein.

BACKGROUND

Field of the Invention

The present invention relates to a method for producing instant fried noodles and a frying treatment device for performing a frying treatment in a frying process of the instant fried noodles.

Background Information

Instant fried noodles (fried noodles) are produced by putting noodle strings thereof gelatinized by steaming or boiling in a plurality of retainers and then dipping the noodle strings in a high-temperature fry tank in which oil is put to fry drying the noodle strings. Subsequently, the noodle strings of the instant fried noodles turn to be porous by such fry drying. Such structures provide superior absorption of hot water and superior instant cooking which makes the noodle strings edible after three minutes from pouring hot water in a cup in the case of cup noodles.

Specifically, referring to a frying treatment process of general instant fried noodles, first of all, noodle strings for one person gelatinizing-treated by steaming or boiling are put in fluid permeable cup-shaped or bowl-shaped retainers to dip the noodle strings into a high-temperature fry tank with a lid closed. Moisture contained in the noodle strings is rapidly discharged by soaking the noodle strings in a high-temperature fry tank so that the noodle strings may turn to be porous. In addition to that, the noodle strings gradually float to a surface of each retainer and become hardened by discharging moisture. When frying is finished, the noodle strings are substantially housed in inside the retainers to be fixed to a noodle lump state with a structure where a noodle lump is dense in an upper side of each retainer and the noodle lump is non-dense in a lower side of each retainer.

On the other hand, in the case of machine production, a plurality of retainers are supported by two endless parallel chains and are conveyed into a fry tank by movements of the two endless chains to fry noodles in the plurality of retainers. Subsequently, the noodles are lifted up from the fry tank by movements of the two chains when moisture contained in noodle strings becomes some %. After lifting up the noodles from the fry tank, for the purpose of oil throwing or the like, noodle lumps are conveyed in a horizontal direction for a while with a cover of each retainer open and subsequently, the noodle lumps in the retainers are discharged as well reversing the retainers upside down, making use of a system configured to invert traveling directions of the chains to be conveyed to a next process with an upper surface of each of the noodle lumps (upper side at the time of frying) down.

A reference numeral 100 indicated in FIG. 13 denotes an example of a conventional frying treatment device configured to perform a frying treatment in this frying treatment process. A frying treatment device 100 comprises: a fry tank 102 for storing oil for frying: two chains (endless winding transmitter) 104 arranged parallel to each other, the two chains passing through the fry tank 102; a plurality of shafts 106 fixed between the two chains 104; and a plurality of retainers 108 supported by the plurality of shafts 106. According to the frying treatment device 100, a plurality of noodle lumps 110 filled in respective retainers 108 are fried in the fry tank 102 and are then lifted up to an inclined upper direction from the fry tank 102. And the plurality of noodle lumps 110 are conveyed in a horizontal direction for a while and then the plurality of retainers 108 are reversed to drop a noodle lump 110 on a carry-out conveyor 112 so as to be moved to a next step.

A general frying process is mentioned above. In such a method, however, a fry oil considerably remains at a lower side of the noodle lumps (a lower side at the time of frying) and in the case of a vertical-type cup noodle, a content of oil and fat of the noodles contained in the lower side of the noodle lumps is by about 30% to 50% higher than a content of oil and fat contained in an upper side of each of the noodle lumps. Accordingly, non-uniformity of texture and the state of reconstitution caused by the difference of the content of oil and fat were easily generated and the lower side of each of the noodle lumps is sometimes in a color tone which has a wet-like appearance with oil. As a result, there is room to improve quality of the noodle lumps.

In contrast, Japanese Patent Application Publication No. 52-154542 and Japanese Patent Application Publication No. 60-196160 are respectively known as a method for frying instant fried noodles to maintain a regular content of oil and fat contained in noodle lumps. Such patent publications both aim at evenly frying noodle strings in a plurality of retainers by reversing or rotating the plurality of retainers in a fry tank. However, when rotating the plurality of retainers during a frying treatment, noodle lumps are in the state of a ball-lid state in the retainers, so that the noodle lumps may not be easily fixed in the state of a retainer internal shape. Further, it is not possible to obtain a shape of a noodle lump which is preferable in a cup instant noodle in which an upper part is highly dense and a lower part is coarse. In addition to that, according to the inventors' verification, the content of oil and fat of the whole noodle lumps eventually rises, which is not preferable.

SUMMARY

It is an object of the present invention to improve quality of instant fried noodles in color tone and texture by uniformizing a content of oil and fat in each noodle lump of the instant fried noodles. The summary of the present invention is described as below.

In a first preferred aspect, there is provided a method for producing instant fried noodles according to the present invention which includes a step of reversing a noodle lump upside down within 15 seconds after detaching the noodle lump from oil in a fry tank in a frying treatment of instant fried noodles.

In a second preferred aspect of the method for producing instant fried noodles according to the present invention, the noodle lump is reversed upside down and is maintained at least for 15 seconds in a reversed state.

In a third preferred aspect of the method for producing instant fried noodles according to the present invention, the frying treatment is performed by putting gelatinized noodle strings in a retainer and immersing the noodle strings in oil in the fry tank and the step of reversing the noodle lump upside down is performed without removing the noodle lump from the retainer.

In a fourth preferred aspect, a method for producing instant fried noodles according to the present invention includes a first method, the first method specifically includes: putting gelatinized noodle strings in a plurality of retainers supported by two endless parallel chains; immersing the plurality of retainers, in which the noodle strings have been put by movements of the two endless chains, in a fry tank to fry the noodle strings; detaching the retainers from oil in the fry tank by movements of the two chains; inverting traveling directions of the chains within 15 seconds after the detachment of the retainers to reverse the retainers upside down; and separating a plurality of fried noodle lumps from the retainers.

In a fifth preferred aspect, a method for producing instant fried noodles according to the present invention includes a second method, the second method includes: putting gelatinized noodle strings in a plurality of retainers supported by two endless parallel chains; immersing the plurality of retainers, in which the noodle strings have been put by movements of the two endless chains, in a fry tank to fry the noodle strings; detaching the retainers from oil in the fry tank by movements of the two chains; reversing the retainers upside down by rotating the pivotally supported retainers within 15 seconds after the detachment of the retainers; conveying the retainers in a state in which the retainers are reversed upside down by movements of the chains: and separating a plurality of fried noodle lumps from the retainers.

In a sixth preferred aspect of the method for producing instant fried noodles, in the second method, time it takes to convey the retainers in a state, in which the retainers are reversed upside down, is at least for 15 seconds.

In a seventh preferred aspect, a frying treatment device according to the present invention specifically used in the second method for producing instant fried noodles which includes: a fry tank for storing oil for frying; two endless chains arranged parallel to each other on the same level, in which one portion is arranged in the fry tank and the other portion is arranged in a space outside the fry tank; a plurality of rotation central shafts supported by the two endless chains; a plurality of retainers rotatably and pivotally supported on the plurality of rotation central shafts; a plurality of reversing systems configured to reverse the plurality of retainers that have been detached from oil in the fry tank upside down by rotating the retainers around the rotation central shafts; and a maintaining system configured to maintain a state in which the retainers are reversed upside down.

In an eighth preferred aspect of the frying treatment device according to the present invention, the plurality of reversing systems each include: a plurality of protrusion portions formed on one of the retainers and frames for fixing the retainers in directions of the chains in a protruding manner; the plurality of protrusion portions rotating around the rotation central shafts along with the retainers; and a plurality of reversing nails arranged near the chains, the plurality of reversing nails rotating the protrusion portions and the retainers around the rotation central shafts by catching the reversing nails on the protrusion portions.

According to the present invention, it is possible to obtain good color toned and high quality noodles having a substantially uniform content of oil and fat contained in a noodle lump in instant fried noodles in an upper portion of the noodle lump and a lower portion of the noodle lump.

BRIEF DESCRIPTION OF THE DRAWINGS

Referring now to the attached drawings which form a part of this original disclosure.

FIGS. 9(a) and 9(b) show a further embodiment of the frying treatment device of the present invention, which is a schematic view for illustrating a function in a half-reversion portion;

DETAILED DESCRIPTION OF THE EMBODIMENTS

Figure 1:
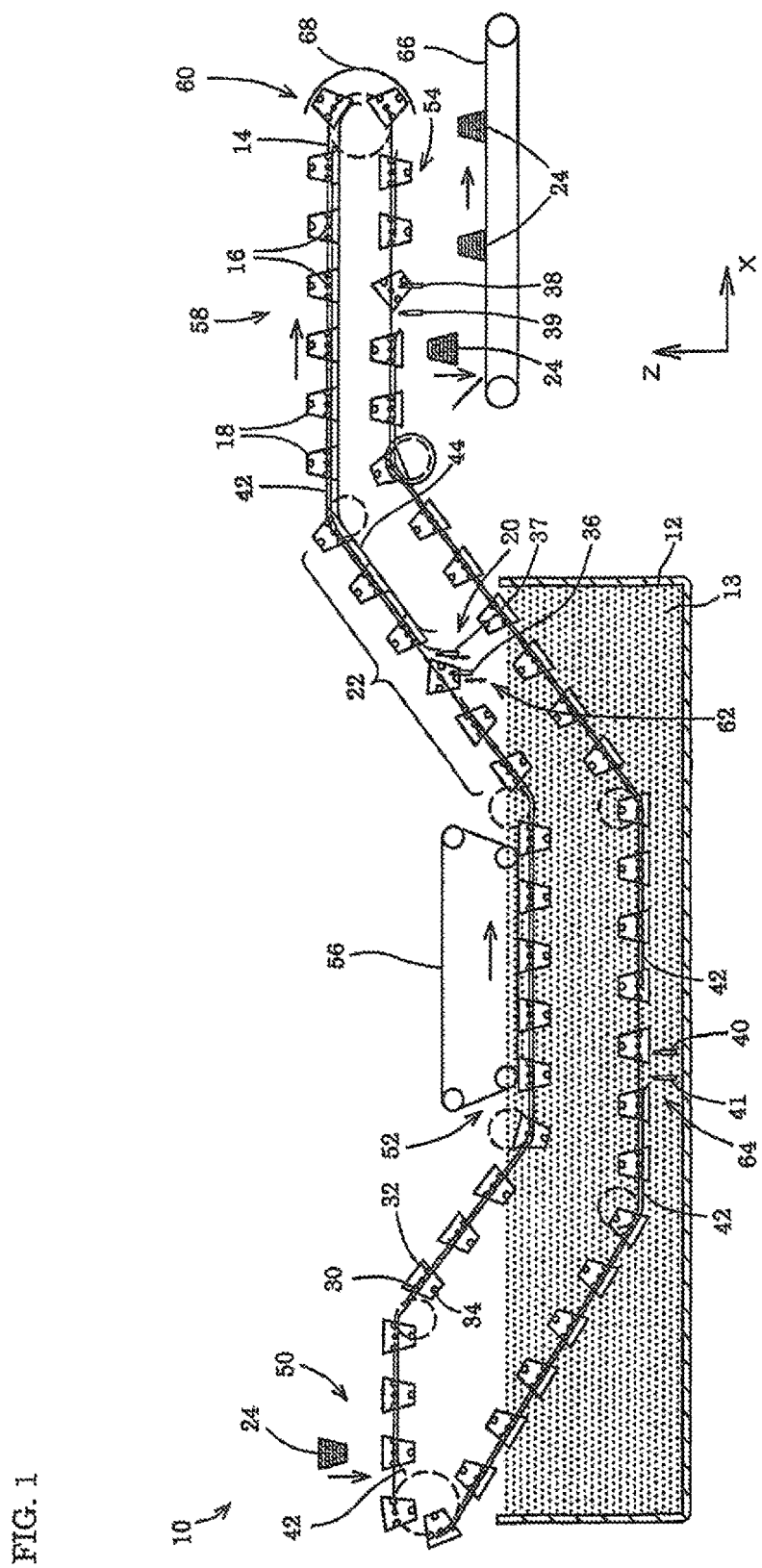
FIG. 1 is a front view showing a frying treatment device of the present invention.

Preferred embodiments of the present invention will now be described as below.

The present invention relates to a method for producing instant fried noodles in which a content of oil and fat of a noodle lump is uniformized as a whole, and a noodle lump having a preferable color tone is obtained immediately after detaching a retainer from a fry tank by reversing the retainer upside down, specifically, within 15 seconds instead of by rotating the retainer in the fry tank or reversing the retainer upside down like Japanese Patent Application Publication No. 52-154542 and Japanese Patent Application Publication No. 60-196160.

In this manner, it is possible to substantially uniformize each content of oil and fat of each noodle lump by reversing a noodle lump upside down immediately after detaching a retainer from a fry tank without problems such as disadvantages at the time of reversing upside down or rotating in the fry tank, that is, a point that the noodle lump is in the shape of a ball and is not fixed to the retainer inside shape (for example, cup shape), so that the noodle lump is highly dense at the top and coarse at the bottom, and a point that the entire noodle lump has a high content of oil and fat. Further, when the noodle lump is reversed upside down over 15 seconds after being detached from the fry tank, it is difficult to uniformize each content of oil and fat of each noodle lump, which makes it difficult to make a content of fat and oil of a lower side of each noodle lump and a content of fat and oil of an upper side of each noodle lump uniform. Preferable time it takes for operation of reversing the noodle lump upside down for uniformization of the content of oil and fat of each noodle lump is preferably 0.1 second or longer to 15 seconds or shorter, after detaching the retainer from the fry tank. Alternatively, it is preferable to maintain the position where the noodle lump has been reversed upside down at least for 15 seconds. The phrase "detach the retainer from the fry tank" herein means the timing when the whole retainer has been moved away from a surface of oil.

Furthermore, typical examples of a concrete method for reversing a noodle lump upside down as mentioned above include a method for reversing a position of a retainer upside down by means of a system configured to invert traveling directions of chains to support the retainer, and a method for reversing a retainer itself upside down during transport, the retainer being rotatably and pivotally supported by chains by means of a rotation system.

More specifically, the present invention exemplifies a method as a first (former) method which includes the steps of: putting gelatinized noodle strings in a plurality of retainers supported by two endless parallel chains; immersing the plurality of retainers, in which the noodle strings have been put by forward movements of the two chains, in a fry tank to fry the noodle strings; detaching the retainers from oil in the fry tank by a forward movement of the chains; inverting traveling directions of the chains within 15 seconds after the detachment of the retainers to reverse the retainers upside down by forward movements of the chains; and detaching a plurality of noodle lumps from the retainers with an upper surface (upper side at the time of frying the noodle strings) of each of the noodle lumps facing downward.

Figure 13:
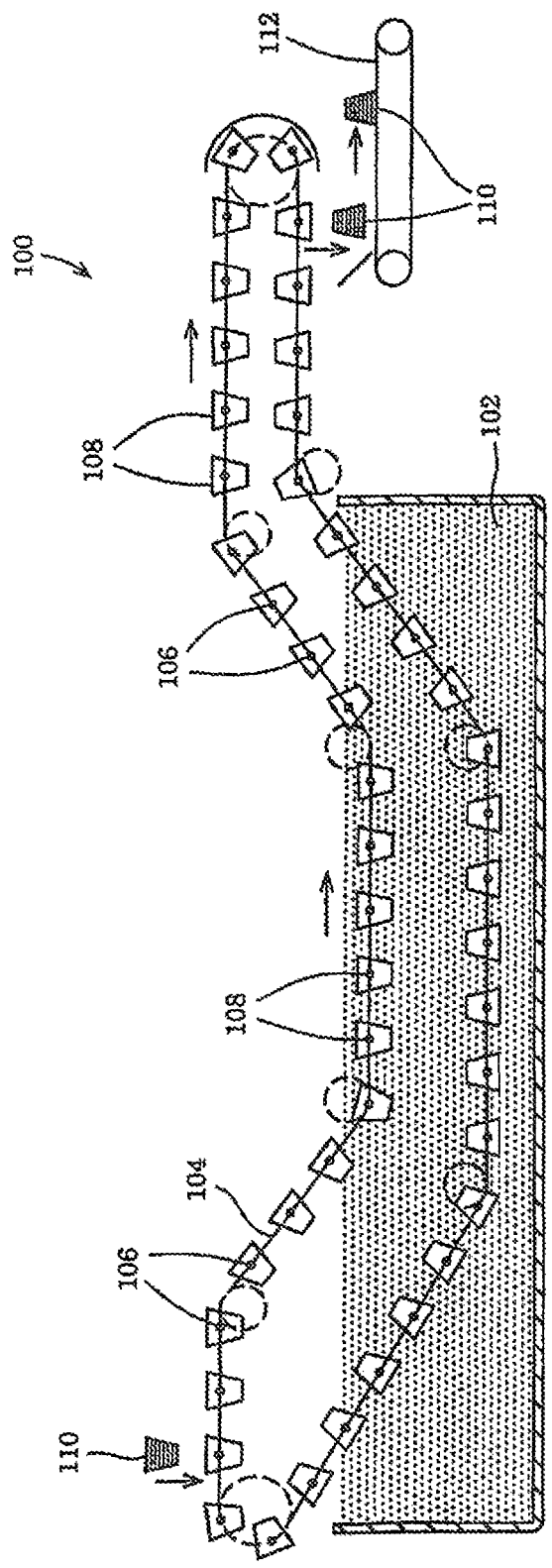
FIG. 13 is a front view showing a conventional frying treatment device.

A method for reversing a position of a plurality of retainers supported by the chains upside down as well as the inversion of traveling directions of the chains from a forward movement to a backward movement by causing the retainers to pass through a sprocket (its central shaft is in a horizontal direction) for winding around the chains is preferable as a method for inverting the traveling directions of the chains. Specifically, in a conventional example in FIG. 13, a device or the like that has made the position of the sprocket wound around the chains extremely closer to the fry tank at a discharge side of the device may be used.

The first method has an advantage that there is no need for special system to reverse the retainers that have been lifted up from the fry tank upside down by rotations of the retainers while driving the retainers in a forward movement direction so as to reverse the retainers upside down by means of a plurality of systems configured to invert the traveling directions of the chains. However, in the case of this method, it is needed to invert the traveling directions of the chains immediately after the removal of the retainers from the fry tank and further arrange a system configured to separate noodle lumps in the retainers, resulting in a possibility of difficulties in adopting in a real production line.

On the other hand, a method for producing instant fried noodles which includes the steps of: putting gelatinized noodle strings in a plurality of retainers pivotally supported by two endless parallel chains; immersing the plurality of retainers, in which the noodle strings have been put by forward movements of the two chains, in a fry tank to fry the noodle strings; detaching the retainers from the fry tank by forward movements of the chains; reversing the retainers upside down by rotating the pivotally supported retainers around rotation central shafts by a half turn within 15 seconds after the detachment of the retainers; conveying the retainers by driving the chains in a state in which the retainers are reversed upside down, keeping the noodle lumps contained in the retainers; and subsequently separating the noodle lumps from the retainers with an upper surface of each of the fried noodle lumps (an upper surface at the time of frying the noodle strings) facing downward, may be exemplified as a second method. Specifically, the device shown in FIG. 1 may be used, however, this will be discussed in detail later.

The second method has many advantages, such as a point of more freely setting a position where the noodle lumps are detached from the retainers than the first method, a point that a retainer reversion maintenance area is provided, where oil is returned to the fry tank after frying for a long period of time, and a point that a frying device may be easily modified from an existing frying device.

In addition, in the second method, it is possible to separate the noodle lumps by appropriate methods such as a method for separating the noodle lumps by a shooter from openings of the retainers while moving the retainers forward in a reversion state, alternatively, a method for separating the noodle lumps at the time of transferring into a backward movement of the retainers by inverting the traveling directions of the retainers by returning to the original position, making a half turn again with the rotation system (retainer reversing upside down system) after moving the retainers forward in a reversion state and causing the retainers to pass through a sprocket for winding around the chains, and a method for separating the noodle lumps by reversing the retainers upside down using the rotation system of the retainers after moving the retainers forward in a reversion state and inverting the traveling directions of the retainers to move the retainers backward. Further, time spent on conveying the noodle lumps that have been reversed upside down after the removal of the retainers from the fry tank in the state in which the retainers are reversed upside down (the state in which an upper surface of each of the noodle lumps faces downward) is preferably at least for 15 seconds.

In this way, a concrete example of the system configured to reverse the position of the retainers upside down may have a simple structure described below. That is, the retainers or frames for fixing the retainers are rotatably and pivotally supported on the rotation central shafts being supported by the two parallel endless chains. And a plurality of protrusion portions protruding toward chain sides are formed on the retainers or the retainer frames. A system configured to reverse the retainers upside down by rotating the retainers with the rotation central shafts in the center by catching a plurality of reversing nails on the plurality of protrusion portions provided near the chains is preferable.

The frying treatment device with such a configuration is capable of rotating the retainers around respective rotation central shafts to reverse the retainers upside down simply by catching nails on the protrusion portions formed on retainer sides during the movements of the chains. And it is possible to use a conventional frying device which does not allow the retainers to rotate by removing the nails in addition to the simple structure thereof and the frying treatment device of the present invention at the same time. In addition, there are such effects or the like that can easily modify the reversion of the retainers by providing the other nails backward the nails when failing in the reversion of the retainers upside down.

Preferred embodiments and experimental results of the present invention will now be described in further detail. The actual production device will now be described with reference to the drawings as below.

First, the inventors of the present invention measured a content of fat and oil of a lower portion of each of noodle lumps and a content of oil and fat of an upper portion of each of noodle lumps produced by an ordinary frying treatment method. As a result, as indicated in Comparative Example 1 in Table 1, the content of oil and fat of the lower portion of each of the noodle lumps was by about 40% higher than the content of the upper portion of each of the noodle lumps.

Therefore, a method for reversing retainers upside down in fry oil in accordance with prior art documents was tried. As indicated in Comparative Examples 2 and 3 in table 1, although there was a case where the content of oil and fat of the upper portion of each of the noodle lumps and the content of oil and fat of the lower portion of each of the noodle lumps were equalized, the content of oil and fat of each noodle lump considerably increased and particularly, in Comparative Example 2, the noodle lumps got into the shape of a ball, which was not preferable. Accordingly, when a method for reversing the retainers upside down immediately after separating the noodle lumps from the fry oil, the shape of the noodle lumps is preferable and in addition, the content of oil and fat is not so much different between the upper portion and the lower portion of each of the noodle lumps, which was preferable.

A concrete production method and an experimental method related to an experiment indicated in Table 1 will now be described as below.

A small quantity of starch was added to wheat flour to obtain 1 kg of main material powder and 300 ml of kneading water in which brine water and common salt were dissolved was added to this to be adequately mixed by a mixer. The obtained dough was composite-rolled out in accordance with a usual method. Subsequently, the dough was repeatedly rolled out by a rolled-out roll to form a noodle belt having a thickness of 0.8 mm. The noodle belt was cut by a cutting blade of a square blade No. 18 to obtain noodle strings. These raw noodle strings were steamed by steam of 100° C. to be gelatinized and were immersed in a seasoning liquid containing 10% salt for a short period of time to be cut into one meal amount that was 100 g. This was placed into permeable retainers each having a large number of holes which was a substantially cylinder having a diameter of 90 mm in an opening and 70 mm in depth by punching and then put lids where the large number of holes were formed by punching on the retainers with lid sides (openings) facing upward to fry the one meal amount by immersing the retainers containing one meal amount of these raw noodle strings in a fry tank with perm oil at 150° C. for 2 and a half minutes. In addition, this experiment was performed by the use of lines for experiments.

Comparative Example 1

As mentioned above, the retainers were immersed in a fry tank for 2 and a half minutes and were then detached from the fry tank. After maintaining in a state, in which upper portions of the retainers, that is, opening sides of the retainers turned upward for exactly 40 seconds, the openings of the retainers were directed downward to remove dried noodle lumps to put the noodle lumps on a stainless grid with a top surface of each of the noodle lumps (upper side at the time of frying) facing down, followed by being allowed to stand in this state for a while. This method exemplifies a general frying treatment method being currently performed.

Examples 1 and 2

In the same manner as in Comparative Example 1 mentioned above, retainers were immersed in a fry tank for 2 and a half minutes and were then detached from the fry tank. Immediately after that, the retainers were reversed upside down and were maintained in a reversion state for 40 seconds (Example 1) or 15 seconds (Example 2) and followed by opening lids of the retainers to remove dried noodle lumps to put the noodle lumps on a stainless grid with a top surface (upper side at the time of frying) of each of the noodle lumps facing down, followed by being allowed to stand in this state for a while. Such methods in Examples 1 and 2 respectively exemplify a frying treatment method of the present invention to reverse the retainers upside down immediately after frying.

Example 3

And similarly, the retainers were maintained with retainer openings turned up for 15 seconds after being detached from the fry tank and exactly 15 seconds later, the retainers were maintained in a state in which the retainers were reversed upside down for 40 seconds. After maintaining in the state, lids of the retainers were open to remove dried noodle lumps to put the noodle lumps on a stainless grid with a top surface (upper side at the time of frying) of each of the noodle lumps facing down, followed by being allowed to stand in this state for a while. This method in Example 3 is a frying treatment method of the present invention to reverse the retainers upside down after 15 seconds from frying.

Comparative Examples 2 and 3

Further, in Comparative Examples 1, after immersing the retainers in the fry tank having perm oil at 150° C., at the timing of either 30 seconds or 120 seconds from the beginning of frying, the retainers were reversed upside down in the fry tank. And the noodle strings were fried, keeping in the reversed posture during remaining time (2 and a half minutes in the total of normal and reverse rotations). Even after detaching the retainers from the fry tank, the retainers were maintained in the reversed state (keeping retainer openings downward-facing) for 40 seconds, followed by opening the lids of the retainers to remove the dried noodle lumps to put the noodle lumps on the stainless grid with the top surface (upper side at the time of frying) of each of the noodle lumps facing down and was then allowed to stand in this state for a while. This method exemplifies a method for reversing the retainers upside down in the fry tank respectively described in JP 52-154542 and JP 60-196160.

Measurement results of a content of oil and fat of each noodle lump and comments on the results in the aforementioned Examples 1 to 3 and Comparative Examples 1 to 3 were shown in Table 1. Additionally, in table 1, the unit of the content of oil and fat is weight % and the numerical values regarding Examples 1 to 3 and Comparative Examples 2 and 3 are mean values of the number N of Samples=2 and the mean values of the number N of samples=5 regarding Comparative Example 1.

TABLE 1

|  | Steps | Content of oil and fat of an upper portion | Content of oil and fat of a lower portion | Comments |
| --- | --- | --- | --- | --- |
| Example 1 | Reverse retainers immediately after frying noodle strings →maintain the reversion for 40 seconds → remove noodle lumps | 19.9 | 18.1 | Satisfactory because of no color unevenness |
| Example 2 | Reverse retainers immediately after frying noodle strings →maintain the reversion for 15 seconds → remove noodle lumps | 21.0 | 19.7 | Satisfactory because of no color unevenness |
| Example 3 | Reverse retainers immediately after frying noodle strings →maintain the reversion for 40 seconds → remove noodle lumps | 19.6 | 21.4 | Satisfactory because of no color unevenness |
| Comparative Example 1 | maintain in a right position for 40 seconds after frying noodle strings →remove noodle lumps | 16.5 | 23.5 | Uneven color |
| Comparative Example 2 | Reverse retainers in oil 30 seconds after starting frying noodle strings →maintain the reversion for 40 seconds after frying →remove noodle lumps | 25.4 | 23.5 | Noodle lumps are in the shape of a ball and a content of oil and fat is quite high. |
| Comparative Example 3 | Reverse retainers in oil 120 seconds after starting frying noodle strings→maintain the reversion for 40 seconds after frying → remove noodle lumps | 23.4 | 28.6 | A content of oil and fat is quite high. |

As indicated in Examples 1 to 3, it has turned out that it is possible to produce even noodle lumps without a big difference between an upper portion and a lower portion of each of the noodle lumps and a big difference in color tone between an upper surface and a lower surface of each of the noodle lumps by the reversal of the retainers upside down within 15 seconds after frying noodle strings (after detaching the retainers from the fry tank). Consequently, a device which is the most suitable for use in an actual production line was studied.

In FIG. 1, reference numeral 10 indicates one example of a frying treatment device (used for the second production method of the present invention) suitable for a direct use for performing a method for producing instant fried noodles of the present invention.

A frying treatment device 10 comprises: a fry tank 12 for storing oil 13 for frying; two chains 14 (endless winding transmitter) arranged parallel to each other on the same level, in which one portion is arranged in the fry tank and the other portion is arranged in a space outside the fry tank; a plurality of rotation central shafts 16 supported by the two chains 14; a plurality of retainers 18 that are rotatably and pivotally supported on the plurality of rotation central shafts 16 and pass through the fry tank 12; a plurality of reversing systems 20 configured to reverse the plurality of retainers 18 upside down by rotating the retainers 18 that have passed through the fry tank 12 around the rotation central shafts 16; and a plurality of guide rails (maintaining systems) 42 for maintaining a state in which the retainers 18 are reversed upside down. And the frying treatment device 10 is suitable for a direct use for performing the second production method of the present invention by including a plurality of reversing systems 20 configured to reverse the retainers 18 that have been detached from oil 13 in the fry tank 12.

The frying treatment device 10 includes an inclined portion 22 to cause the retainers 18 having passed through the fry tank 12 to be detached from oil 13 in the fry tank 12 to an obliquely upward direction by the two chains 14. The plurality of reversing systems 20 are provided in a half-reversion portion 62 of the inclined portion 22. Immediately after the retainers 18 are detached from the oil 13 in the fry tank 12 by the reversing systems 20, it is possible to reverse the retainers 18 containing noodle strings 24 upside down by reversing the retainers 18 upside down. In addition, noodle strings 24 are described as a noodle lump 24 after being fried.

Figure 2:
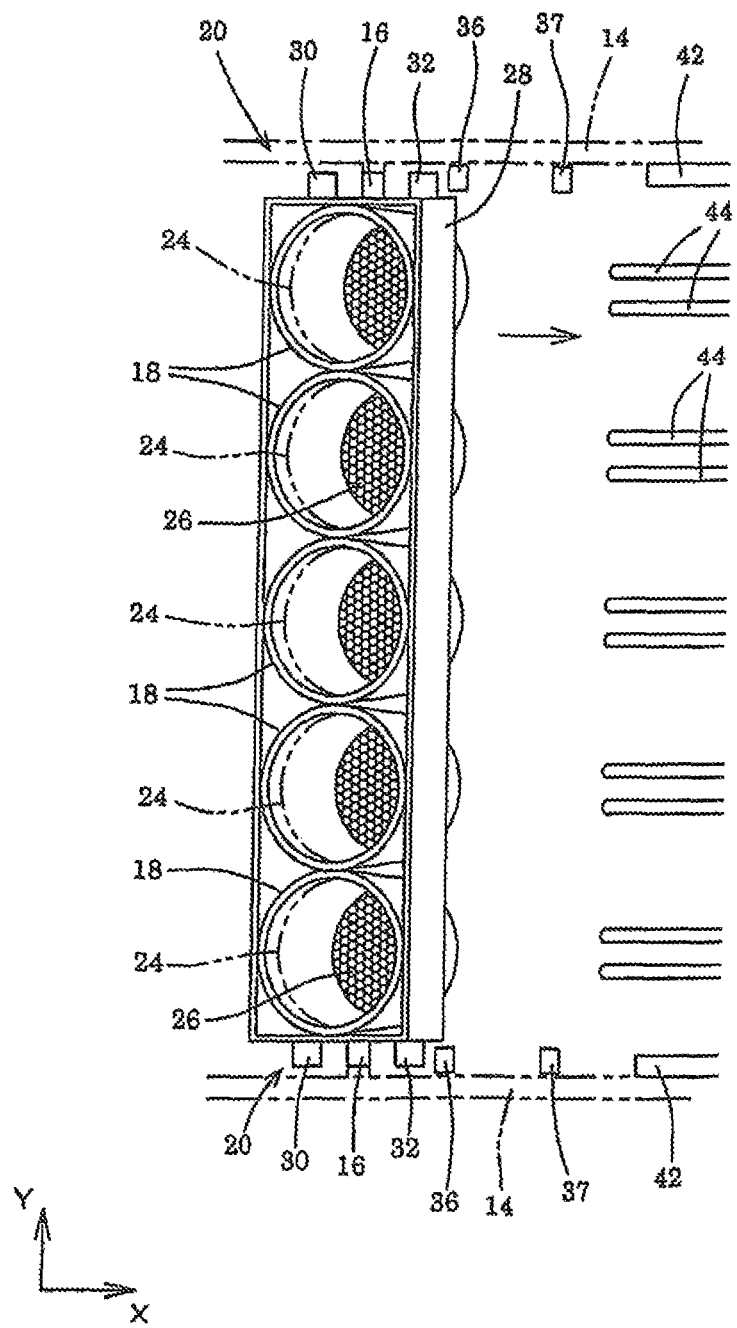
FIG. 2 is an enlarged plan view showing a part of the frying treatment device shown in FIG. 1.

As shown in FIG. 2, the plurality of retainers 18 each have a large number of holes on each bottom 26 by punching so as to have properties to pass a liquid through. Further, five retainers 18 are arranged in a conveyance direction (X-axis direction) and at right angles (Y-axis direction) to be fixed in a frame 28 and are integrally conveyed to be reversed upside down.

The reversing systems 20 each include a plurality of protrusion portions 30, 32 with each of the rotation central shafts 16 interposed therebetween, the plurality of protrusion portions 30, 32 protruding in a direction of the chains 14 rotating along with the retainers 18, one protrusion portion 34 provided downward each of the rotation central shafts 16 to rotate with each of the retainers 18 and protrude in a chain direction, a plurality of reversing nails 36 provided near the chains 14 to cause the retainers 18 to rotate around the rotation central shafts 16 by catching on the protrusion portion 34, and a plurality of reversing nails 37 for rotating the retainers 18 around the rotation central shafts 16 by catching on the protrusion portions 32. Further, the protrusion portions 30, 32 and 34 may respectively have a roller. Furthermore, the plurality of reversing nails 36 may allow the retainers 18 to pass through without catching on the protrusion portions 30, 32 and 34 by being moved downward an up-and-down driving system such as a cylinder.

A plurality of reversing nails 38 and 39 are also provided in a noodle lump detaching portion 54 where the noodle lump 24 are detached from the retainers 18 and a plurality of reversing nails 40 and 41 are also provided in a returning portion 64 to return the direction of each of the retainers 18. Further, the reversing nails 38, 39, 40 and 41 may be fixed types, respectively, which do not move up and down, and operation thereof will be described later.

Furthermore, the protrusion portions 30 and 32 slide and a plurality of guide rails 42 configured to control (maintain) the posture of the retainers 18 are arranged on substantially entire chains 14. A drop prevention rail 44 for allowing the lower portion of the noodle lump 24 to slide is arranged in parallel with the chains 14 so as to prevent the noodle lump 24 from falling by being detached from the retainers 18 immediately after the retainers 18 are reversed upside and down by the reversing systems 20. A covered conveyor 56 for preventing noodle strings 24 from being separated upward from the retainers 18 by discharging water and pressing the noodle strings 24 from the top is provided upward a dipping portion 52 where the noodle strings 24 are dipped in the oil 13 in the fry tank 12.

Functions and effects of the frying treatment device 10 with such a configuration will now be described.

The noodle strings 24 gelatinized by steaming and boiling in the previous process are put in the retainers 18 in which openings face upward in an injection portion 50 of noodle strings. The noodle strings 24 that have been put in the retainers 18 are moved in an X-axis plus direction by the chains 14 and are immersed in the hot-temperature oil 13 in the fry tank 12 in the dipping portion 52. When the noodle strings 24 become porous structured by frying the noodle strings 24 followed by discharging water, the noodle strings 24 are cured to be each substantially in an inner shape of each retainer 18. As a result, the noodle strings 24 are fixed to be in a shape of noodle lumps 24 having a structure in which an upper side is highly dense and a lower side is coarse in the retainers 18.

The retainers 18 and the noodle lump 24, in which frying has been finished, are detached from the oil 13 in the fry tank 12 in an X-axis plus direction and in an obliquely upward direction by the chains 14. And the inclined portion 22 is moved in an X-axis plus direction and an obliquely upward direction.

Figure 3:
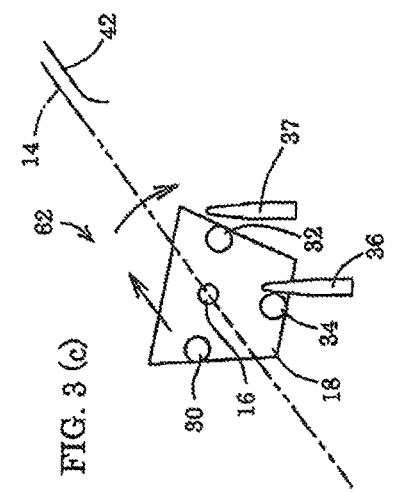
FIGS. 3(a)-3(f) are schematic views for illustrating a function in a half-reversion portion of the frying treatment device shown in FIG. 1.
Figure 3:
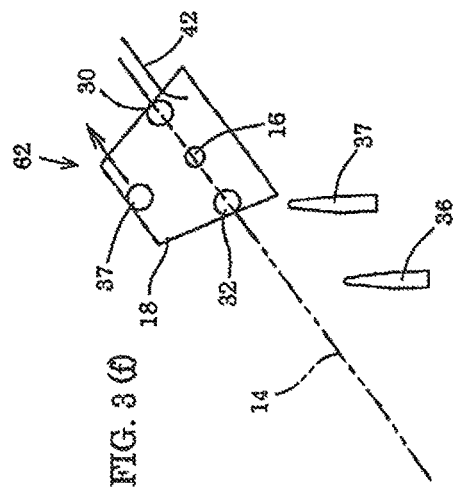
Figure 3:
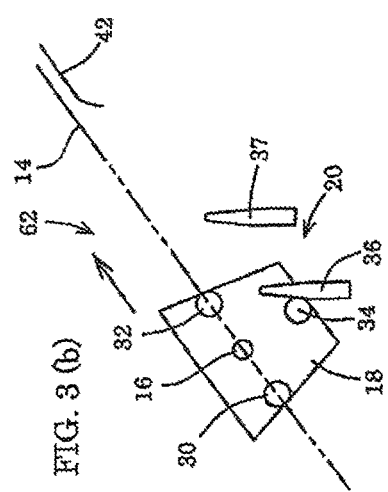
Figure 3:
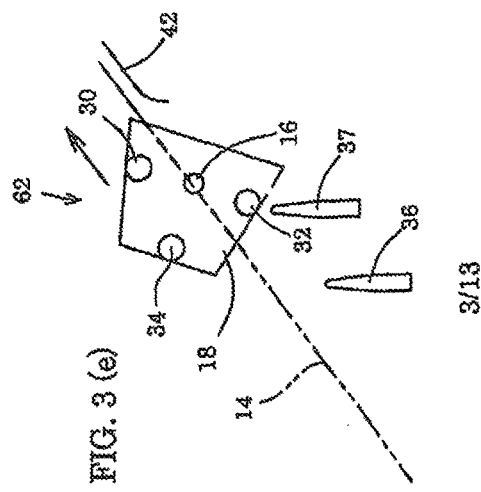
Figure 3:
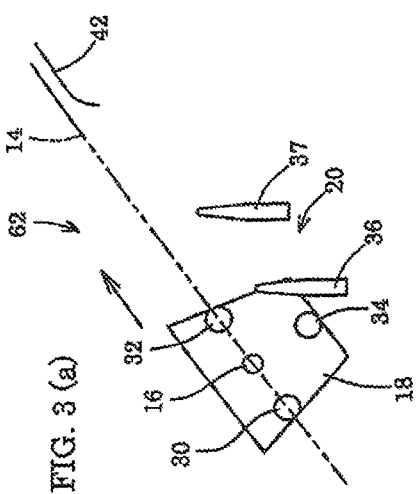
Figure 3:
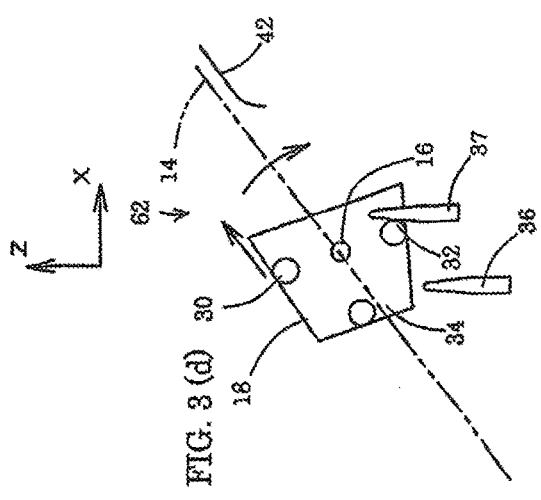

The retainer 18 and the noodle lump 24, in which the inclined portion 22 is moved in the X-axis plus direction and in the obliquely upward direction, are coming close to reversing nails 36, 37 as shown in FIG. 3 (*a*). In the half-reversion portion 62, as shown in FIG. 3 (*b*), a protrusion portion 34 abuts a reversing nail 36. As shown in FIG. 3 (*c*), the reversing nail 36 that abuts the protrusion portion 34 rotates the retainer 18 clockwise while catching the reversing nail 36 on the protrusion portion 34. Subsequently, as shown in FIGS. 3 (*d*) and 3 (*e*), the retainer 18 is caused to rotate clockwise while catching a reversing nail 37 on a protrusion portion 32 so as to reverse the retainer 18 upside down as shown in FIG. 3 (*f*). In addition, for the purpose of optimization in performing a method for producing instant fried noodles of the present invention, the position of the half-reversion portion 62 and the feeding rate of the chains 14 are set so that the time it takes for the retainers 18 to be moved to the half-reversion portion 62 and reversed after being detached from the oil 13 in the fry tank 12 may be within 15 seconds.

As shown in FIG. 1, after a horizontal feeding portion 58 is moved in an X-axis plus direction, the traveling directions of the retainers 18 and the noodle lump 24 are inverted in an X-axis minus direction in a traveling direction inversion portion 60 to move the retainers 18 and the noodle lump 24 to the noodle lump detaching portion 54 with the openings of the retainers 18 face upward. In addition, for the purpose of optimization in performing the method for producing instant fried noodles of the present invention, the length of the horizontal feeding portion 58 and the rotation rate of the chains 14 are set so that the time it takes to move the retainers 18 and the noodle lump 24 at the horizontal feeding portion 58 in the X-axis plus direction may be at least 15 seconds.

Figure 4:
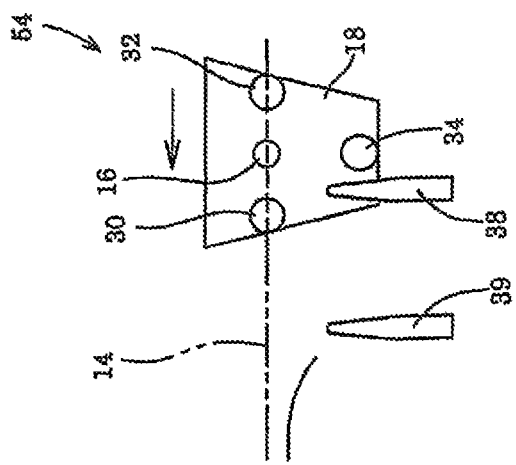
FIGS. 4(a)-4(c) are schematic views for illustrating a function in a noodle lump detaching portion of the frying treatment device shown in FIG. 1.
Figure 4:
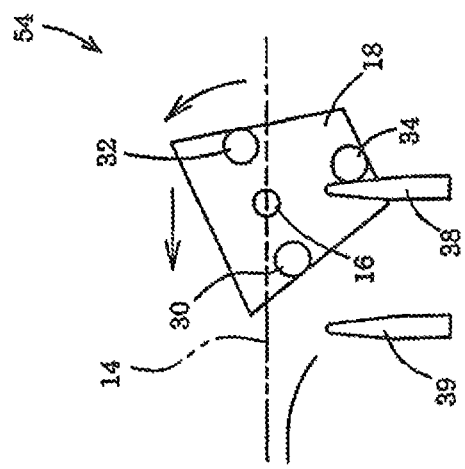
Figure 4:
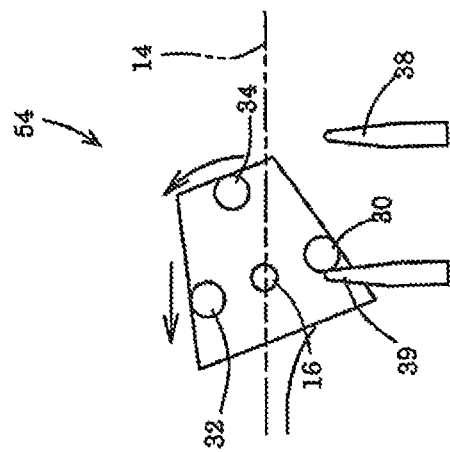

In the noodle lump detaching portion 54, as shown in FIGS. 4 (*a*) and 4 (*b*), a reversing nail 38 is caught on a protrusion portion 34 to rotate a retainer 18 clockwise. Subsequently, as shown in FIG. 4 (*c*), a reversing nail 39 is caught on a protrusion portion 30 to rotate the noodle lump 24 counterclockwise. This leads the retainer 18 to be reversed upside down in a state in which the opening thereof faces downward. And as shown in FIG. 1, the noodle lumps 24 are detached downward from retainers 18 to fall on a carry-out conveyor 66. The noodle lumps 24 that have fallen on the carry-out conveyor 66 are fed to a next process.

Figure 5:
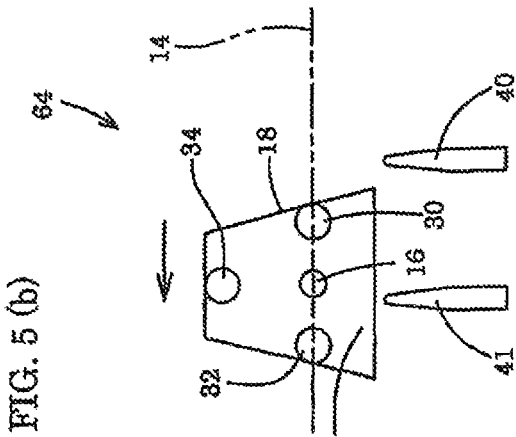
FIGS. 5(a) and 5(b) are schematic views for illustrating a function in a returning portion of the frying treatment device shown in FIG. 1.
Figure 5:
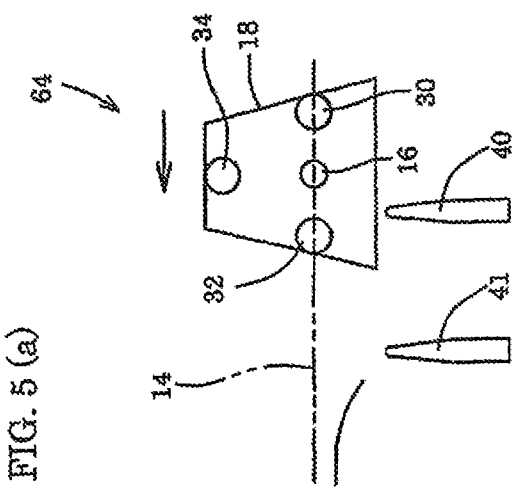

The retainers 18, from which the noodle lumps 24 are detached, are moved in an X-axis minus direction up to the returning portion 64. As shown in FIGS. 5 (*a*) and 5 (*b*), in the returning portion 64, the protrusion portion 34 is positioned upward and does not interfere with reversing nails 40 and 41. Accordingly, the retainers 18 pass through the returning portion 64 while keeping the state as they are without rotation. The retainers 18 that have passed through the returning portion 64 are moved to the injection portion 50 of the noodle strings to put again the noodle strings 24 in the retainers 18.

Figure 6:
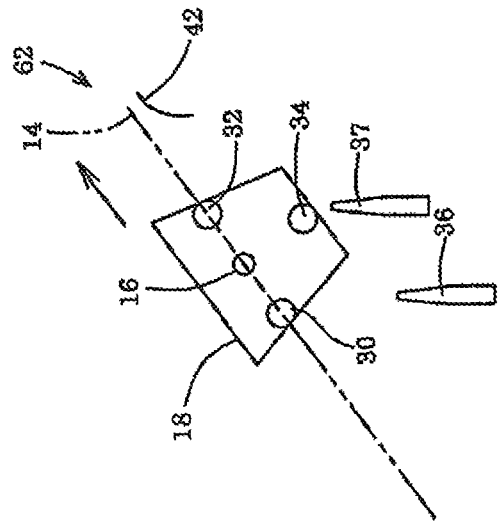
FIGS. 6(a) and 6(b) are schematic views for illustration a function in a half-reversion portion of the frying treatment device shown in FIG. 1.
Figure 6:
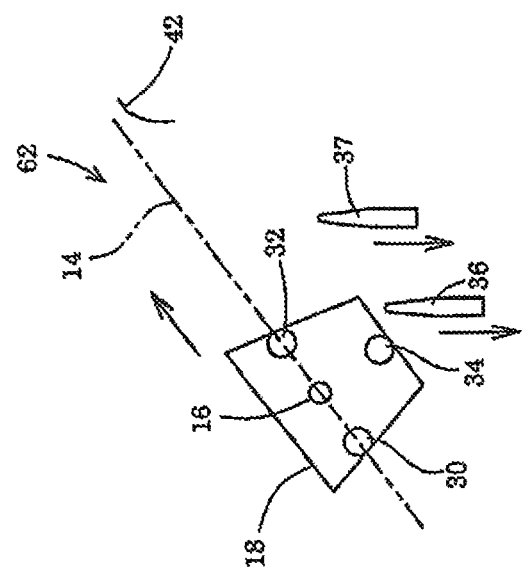

In the case where such a trouble that the noodle strings 24 are not housed in the retainers 18 in the injection portion 50 of noodle strings or the like arises, as shown in FIG. 6 (*a*), the reversing nails 36 and 37 are moved downward by an up-and-down driving system when the retainer 18 with trouble is moved to the half-reversion portion 62. When the reversing nails 36 and 37 are moved downward, as shown in FIG. 6 (*b*), the reversing nails 36 and 37 do not interfere with protrusion portions 34 and 32, so that a retainer 18 with trouble passes through the half-reversion portion 62 without rotation. A camera or a sensor or the like detects as to whether the retainer 18 has any trouble.

In the retainer 18 that has passed through the half-reversion portion 62 without rotation and vertical reversion, traveling directions of the retainers 18 are inverted so that the openings thereof may be directed downward in the traveling direction inversion portion 60. In addition, a removing prevention rail 68 is provided in the traveling direction inversion portion 60 to prevent the noodle lump 24 from being detached during rotation when the noodle lump 24 is fed into the retainer 18 from the opening of the retainer 18. Although the retainer 18 is subsequently moved in the X-axis plus direction, the reversing nails 38 and 39 and the protrusion portion 34 do not interfere each other because the protrusion portion 34 is positioned upward, the retainer 18 passes through the noodle lump detaching portion 54 without rotation in a state in which the opening thereof faces downward.

In the case where the retainer 18 is moved to the returning portion 64 in a state that the opening thereof faces upward due to some sort of trouble, the retainer 18 is rotated around in a counter-clockwise direction by catching the reversing nail 40 on the protrusion portion 34 and catching the reversing nail 41 on the protrusion portion 30 to return the retainer 18 to a normal direction. As a result, the retainer 18 returns in a direction where the noodle strings 24 may be put in the injection portion 50 of noodle strings.

Such a frying treatment device 10 is suitable for a direct use in performing a method for producing instant fried noodles of the invention which can achieve reversing the noodle lump 24 upside down within 15 seconds after detaching the noodle lump 24 from the oil 13 in the fry tank 12 by providing a half-reversion portion 62 to detach the retainer 18 from the oil 13 in the fry tank 12.

While one embodiment of the frying treatment device of the present invention has been described so far, the frying treatment device of the present invention is not limited to the abovementioned embodiment.

Figure 7:
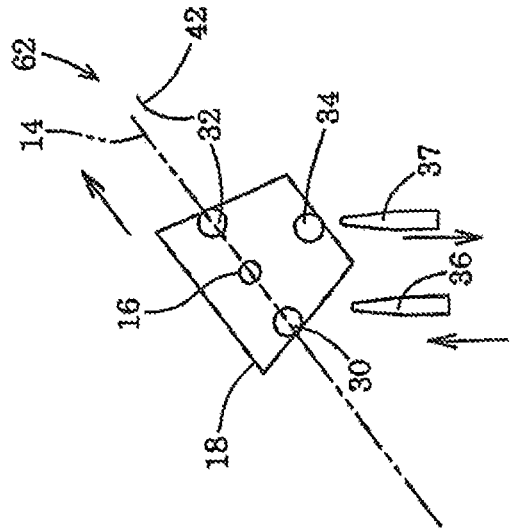
FIGS. 7(a) and 7(b) show another embodiment of the frying treatment device of the present invention, which is a schematic view for illustrating a function in a half-reversion portion.
Figure 7:
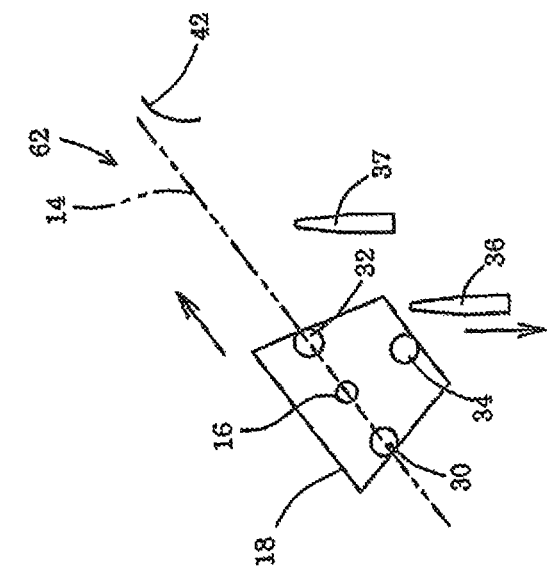

For instance, when a trouble arises, an aspect to pass a half-reversion portion 62 without rotation of a retainer 18 is not limited to the aforementioned embodiment. More specifically, as shown in FIG. 7 (a), firstly, a reversing nail 36 alone is moved downward to avoid an interference with a protrusion portion 34. Secondly, as shown in FIG. 7 (b), the reversing nail 36 may return to upward and a reversing nail 37 may be moved downward to avoid an interference with the protrusion portion 34.

Figure 8:
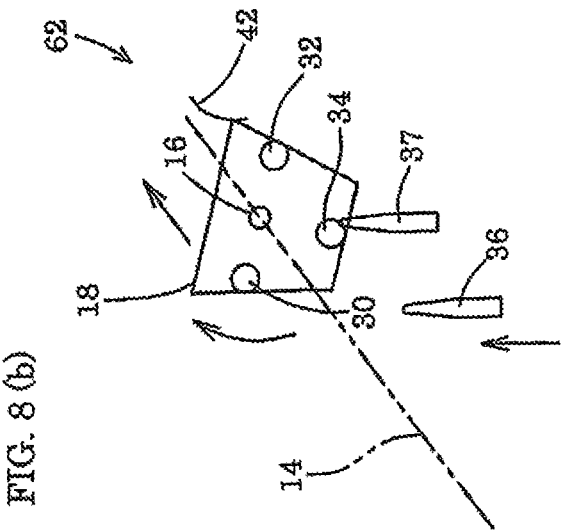
FIGS. 8(a) and 8(b) show still another embodiment of the frying treatment device of the present invention, which is a schematic view for illustrating a function in a half-reversion portion.
Figure 8:
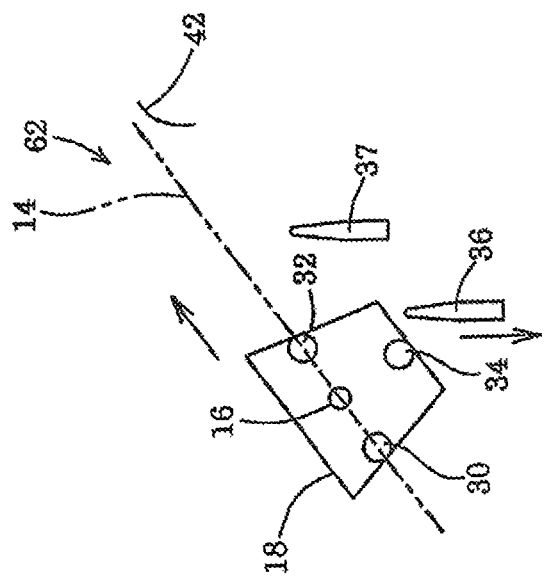

As shown in FIG. 8 (a), firstly, a reversing nail 36 alone is moved downward to avoid an interference with a protrusion portion 34. Secondly, as shown in FIG. 8 (b), a reversing nail 36 alone returns to upward and the reversing nail 37 may not be moved. In this case, although a retainer 18 is slightly rotated by the reversing nail 37, the retainer 18 is rotatable around a rotation central shaft 16. And then the retainer 18 returns to the state in which the opening thereof faces upward by self-weight and passes through a half-reversion portion 62 without up-down reversion of the retainer 18.

As shown in FIG. 9 (a), firstly, a reversing nail 36 alone is rotated around a rotation shaft 70 to avoid an interference with a protrusion portion 34. Secondly, as shown in FIG. 9 (b), a reversing nail 37 does not need to move by reversing the reversing nail 36 to return. In this case, a retainer 18 passes through a half-reversion portion 62 without up-down reversion of the retainer 18.

Figure 10:
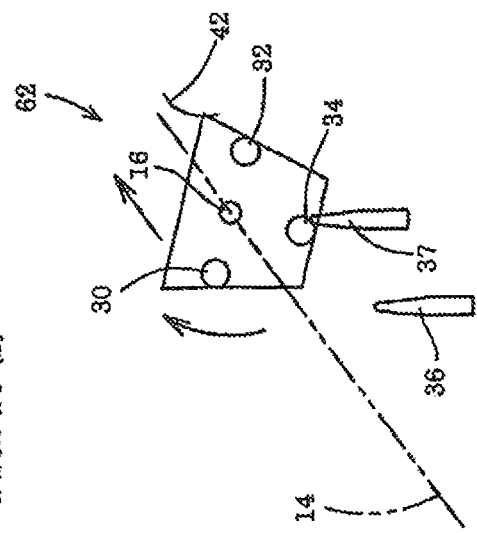
FIGS. 10(a) and 10(b) show a still further embodiment of the frying treatment device of the present invention, which is a schematic view for illustrating a function in a half-reversion portion.
Figure 10:
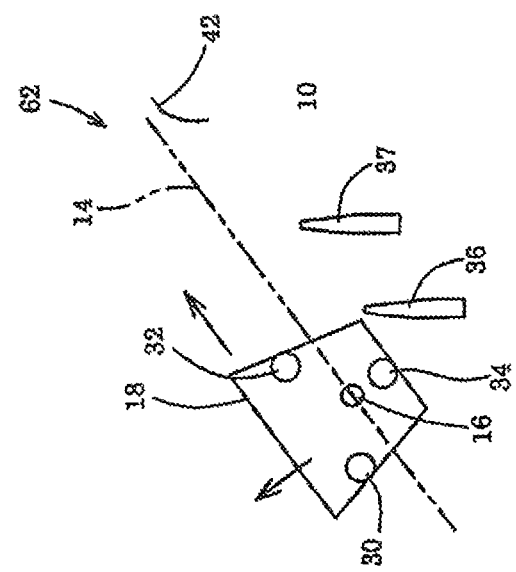

As shown in FIG. 10 (a), a retainer 18 is moved in an upper oblique direction vertical to a chain 14 by a cylinder and the like to avoid an interference between a reversing nail 36 and a protrusion portion 34. Subsequently, as shown in FIG. 10 (b), it is not necessary to move a reversing nail 37 but it is simply necessary to move the retainer 18 in a lower oblique direction to return. In this case, the retainer 18 passes through a half-reversion portion 62 without up-down reversion of the retainer 18.

Figure 11:
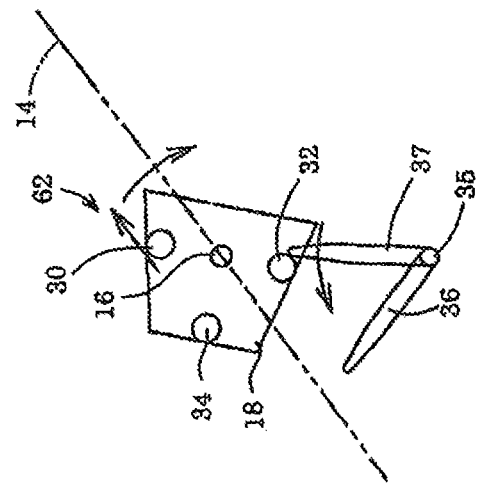
FIGS. 11(a) and 11(b) are schematic views showing another embodiment of a reversing system of the frying treatment device of the present invention.
Figure 11:
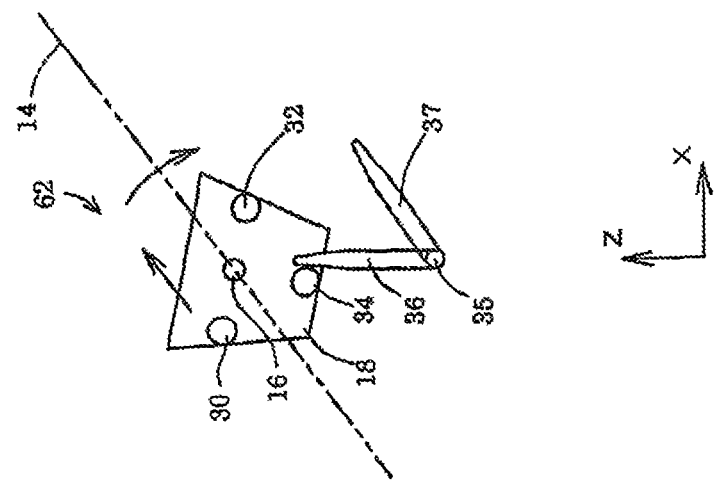

Further, as shown in FIGS. 11 (a) and 11 (b), a reversing system 20 is not limited to the aforementioned embodiment. Typically, the reversing system 20 may be configured to rotate reserving nails 36 and 37 that share a rotation shaft around a rotating shaft 35 in a counter-clockwise direction to reverse a retainer 18 upside down by catching the reversing nail 36 on a protrusion portion 34 followed by catching the reversing nail 37 on a protrusion portion 32.

While preferred embodiments of the present invention have been described so far based on the drawings, the preferred embodiments of the present invention are not limited to these embodiments illustrated in the drawings. For instance, in the aforementioned embodiments, in view of cases where there are injection errors of noodle strings and rotation errors of retainers 18 or the like, a plurality of reversing systems 20 configured to rotate the retainers 18 are used at three places such as a half-reversion portion 62, a noodle lump detaching portion 54, and a returning portion 64. However, the embodiments of the present invention are not limited to this, but it is possible to use the plurality of reversing systems 20 in more places and the returning portion 64 does not need to be arranged. Further, in either of the noodle lump detaching portion 54 and the returning portion 64, each reversing nail for catching on protrusion portions 32, 34 is a fixed type or may be a movable type.

For instance, the number of the retainers 18 aligned in a carry-out direction and a vertical direction in a frame 28 is not limited to 5, but may be 1 to 4 or 6 or greater. And guide rails 42 for restricting the posture of the retainers 18 do not have to be formed over the entire circumferences, but may be arranged only in the place where the retainers 18 are reversed upside down (the openings thereof are downward-facing). Further, in the aforementioned embodiments, the reversing systems 20 (the half-reversion portion 62) are provided on the inclined portion 22. However, to more steadily reverse the retainers 18 upside down, a region, where the retainers 18 are horizontally conveyed after having been detached from the fry tank, may be formed and the reversing systems 20 may be provided in this region. It is possible to obtain a further stable rotation by providing a half-reversion portion 62 in a horizontal position.

Furthermore, in the aforementioned embodiments, while the detachment of noodle lumps is performed by the reversing systems 20 (noodle lump detaching portion 54) each arranged in a position having passed the traveling direction inversion portion 60, these embodiments are not limited to this. The noodle lumps may be detached from the retainers 18 in an outlet of the removing prevention rail 68 of the traveling direction inversion portion 60 by arranging the reversing systems 20 immediately forward the traveling direction inversion portion 60 to put the position of the retainers 18 in a state being reversed upside down back in place.

Figure 12:
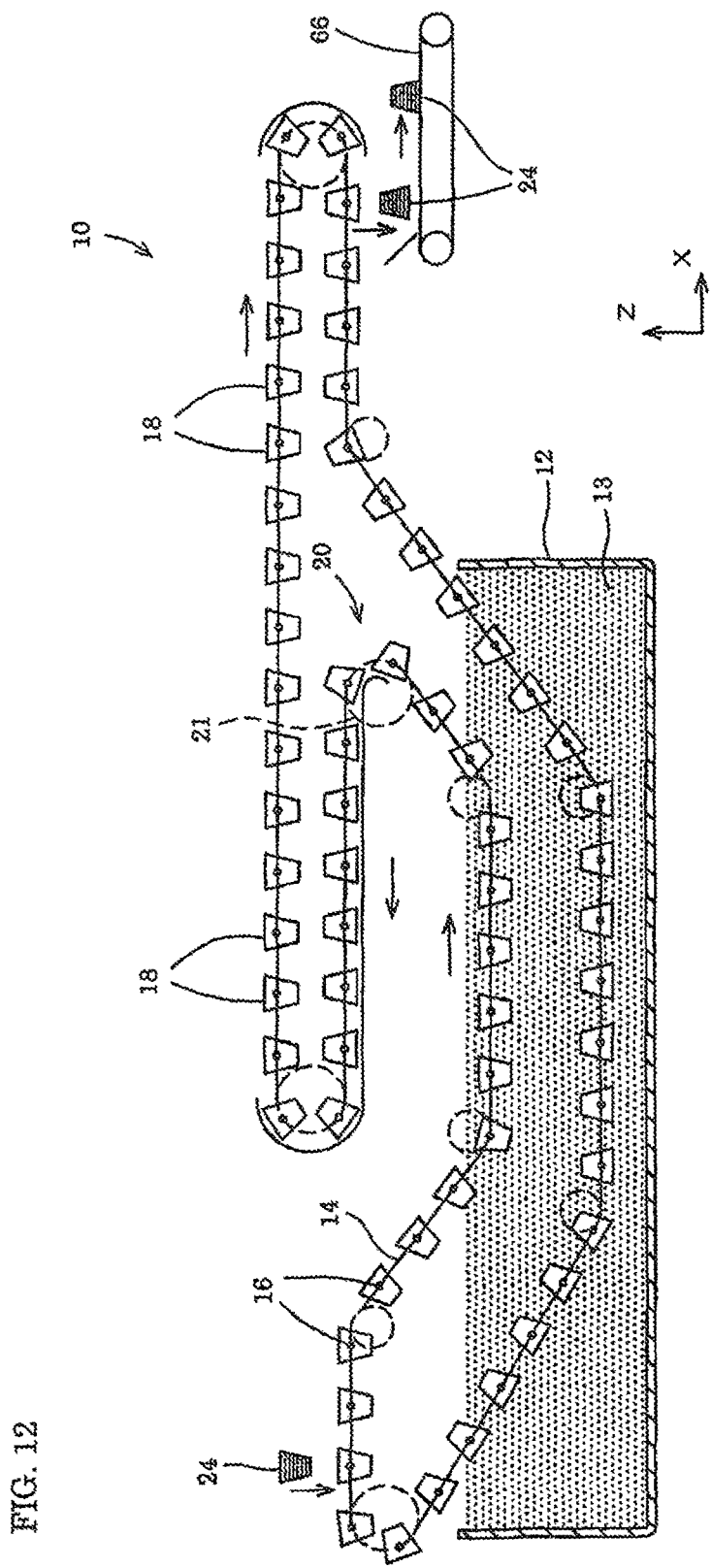
FIG. 12 is a front view showing still another embodiment of the frying treatment device of the present invention.

Moreover, in the explanation of the aforementioned embodiments, while examples of a device to be preferably used in a second production method of the present invention have been described so far, a preferred production device to be used in a first production method typically exemplifies a device shown in FIG. 12 except for a device described in the specification of the present invention. The device shown in FIG. 12 inverts traveling directions of retainers 18 that have been detached from oil 13 in a fry tank 12 within 15 seconds after the detachment by a sprocket 21 to reverse the retainers 18 upside down. And the device conveys the retainers 18 in an X-axis minus direction at least for 15 seconds in a state of up-and-down reversion. It is to be understood that these embodiments respectively indicate specific examples and it is possible to appropriately design devices respectively suitable for the first production method and the second production method without departing from the spirit and scope thereof.

What is claimed is:

1. A method for producing instant fried noodles, comprising:
putting a noodle string into an opening in a retainer and immersing the retainer containing the noodle string in oil in a fry tank with the opening of the retainer facing upward to perform a frying treatment on the noodle string;
detaching a noodle lump obtained by the frying treatment from the oil in the fry tank with the opening of the retainer facing upward without separating the noodle lump from the retainer after the frying treatment;
reversing the retainer upside down within 15 seconds after detaching the noodle lump from the oil in the fry tank to position the opening of the retainer facing downward without separating the noodle lump from the retainer to reverse the noodle lump upside down;
conveying the noodle lump as far as a distance of two retainers or more for a fixed time without contacting the oil in the fry tank while keeping an upside down state in which the noodle lump is contained in the retainer with the opening of the retainer facing downward, preventing the noodle lump from falling after reversing the retainer upside down; and
separating the noodle lump from the retainer after conveying the noodle lump.

2. The method for producing instant fried noodles according to claim 1, wherein the retainer has a lid having a plurality of holes.

3. The method for producing instant fried noodles according to claim 1, further comprising:
maintaining a state in which the noodle lump contained in the retainer is reversed upside down at least for 15 seconds;
inverting a traveling direction of the noodle lump contained in the retainer to direct an opening of the retainer upward; and
separating the noodle lump from the retainer by reversing the retainer with the opening facing upward to cause the noodle lump to fall on a carry-out conveyor.

4. The method for producing instant fried noodles according to claim 1, wherein the retainer is reversed upside down above the fry tank.

5. The method for producing instant fried noodles according to claim 1, wherein the retainer is reversed upside down without removing the noodle lump from the retainer.

6. A method for producing instant fried noodles, comprising:
putting a noodle string into an opening in a retainer and immersing the retainer containing the noodle string in oil in a fry tank with the opening of the retainer facing upward to perform a frying treatment on the noodle string;
detaching a noodle lump obtained by the frying treatment from the oil in the fry tank with the opening of the retainer facing upward without separating the noodle lump from the retainer after the frying treatment;
reversing the retainer upside down within 15 seconds after detaching the noodle lump from the oil in the fry tank to position the opening of the retainer facing downward without separating the noodle lump from the retainer to reverse the noodle lump upside down;
conveying the noodle lump at least for 15 seconds without contacting the oil in the fry tank while keeping an upside down state in which the noodle lump is contained in the retainer with the opening of the retainer facing downward, preventing the noodle lump from falling after reversing the retainer upside down; and
separating the noodle lump from the retainer after conveying the noodle lump.

7. The method for producing instant fried noodles according to claim 6, wherein the retainer has a lid having a plurality of holes.

8. The method for producing instant fried noodles according to claim 6, further comprising
inverting a traveling direction of the noodle lump contained in the retainer to direct an opening of the retainer upward,
the separating the noodle lump from the retainer including reversing the retainer with the opening facing upward to cause the noodle lump to fall on a carry-out conveyor.

9. A method for producing instant fried noodles, comprising:
putting each of gelatinized noodle strings into an opening in each of a plurality of retainers supported by two endless chains, the endless chains being arranged parallel to each other;
immersing the plurality of retainers with the openings of the retainers facing upward, in which the noodle strings have been put by movements of the two endless chains, in a fry tank to fry the noodle strings;
detaching the retainers from oil in the fry tank with the openings of the retainers facing upward after frying the noodle strings by movements of the two chains to detach a plurality of fried noodle lumps from the oil in the fry tank;
inverting traveling directions of the chains within 15 seconds after detaching the plurality of noodle lumps from the oil in the fry tank to reverse the noodle lumps upside down by reversing the retainers upside down to position the openings of the retainers facing downward without separating the noodle lumps from the retainers;
conveying the noodle lumps as far as a distance of two retainers or more for a fixed time without contacting the oil in the fry tank while keeping an upside down state in which the noodle lumps are contained in the retainers with the openings of the retainers facing downward, preventing the noodle lumps from falling after reversing the retainers upside down; and
separating the plurality of fried noodle lumps from the retainers after conveying the noodle lumps.

10. The method for producing instant fried noodles according to claim 9, wherein the traveling directions of the chains are inverted to reverse the retainers upside down above the fry tank.

11. The method for producing instant fried noodles according to claim 9, wherein the traveling directions of the chains are inverted to reverse the retainers upside down without removing the noodle lumps from the retainers.

12. A method for producing instant fried noodles, comprising:
putting each of gelatinized noodle strings into an opening in each of a plurality of retainers supported by two endless chains, the endless chains being arranged parallel to each other;
immersing the plurality of retainers with the openings of the retainers facing upward, in which the noodle strings have been put by movements of the two endless chains, in a fry tank to fry the noodle strings;
detaching the retainers from oil in the fry tank with the openings of the retainers facing upward after frying the noodle strings by movements of the two chains to detach a plurality of fried noodle lumps from the oil in the fry tank;

inverting traveling directions of the chains within 15 seconds after detaching the noodle lumps from the oil in the fry tank to reverse the noodle lumps upside down by reversing the retainers upside down to position the openings of the retainers facing downward without separating the noodle lumps from the retainers;

conveying the noodle lumps at least for 15 seconds without contacting the oil in the fry tank while keeping an upside down state in which the noodle lumps are contained in the retainers with the openings of the retainers facing downward, preventing the noodle lumps from falling after reversing the retainers upside down; and separating the noodle lumps from the retainers after conveying the noodle lumps.

13. The method for producing instant fried noodles according to claim 12, wherein the retainers are reversed upside down above the fry tank.

14. The method for producing instant fried noodles according to claim 12, wherein the retainers are reversed upside down without removing the noodle lumps from the retainers.

* * * * *